United States Patent [19]

Kolesky

[11] Patent Number: 5,074,046
[45] Date of Patent: Dec. 24, 1991

[54] MANUAL SHEET METAL CUTTER

[76] Inventor: Eugene Kolesky, 17231 Community St., Lansing, Ill. 60438

[21] Appl. No.: 562,032

[22] Filed: Aug. 2, 1990

[51] Int. Cl.$^5$ .................. B26B 13/20; B23D 29/00
[52] U.S. Cl. .................................. 30/259; 30/250; 30/257
[58] Field of Search ............... 30/244, 249, 245, 248, 30/250, 251, 252, 188, 257, 259

[56] References Cited

U.S. PATENT DOCUMENTS

| | | | |
|---|---|---|---|
| 1,399,668 | 12/1921 | Stene | 30/250 |
| 3,034,214 | 5/1962 | Bosse | 30/257 |
| 4,333,235 | 6/1982 | Howard | 30/259 |
| 4,502,222 | 3/1985 | Sargent | 30/251 |

Primary Examiner—Douglas D. Watts
Assistant Examiner—John M. Husar
Attorney, Agent, or Firm—Potthast & Ring

[57] ABSTRACT

A manual sheet metal cutter (10) with a movable upper blade (12B) laterally offset from and integrally formed with a lower movable handle (12A) pivotally connected to, and sandwiched between, a stationary blade member (14) on the offset side of the movable blade (12B) and a stationary handle (16), of which are all pivotally connected together by a single fastener (11) defining a pivot axle. A rearward extension (14A) of the stationary blade (14B) defines an alignment section which bears against a mating alignment portion of an intermediate section (12C) of the movable blade member (12) to maintain the blades (12B, 14B) in correct cutting relationship. The fastener (11) enables pivotal adjustment of the angle of the stationary handle member (16) relative to the stationary blade member (14B), and an arcuate lower edge (14C) of the stationary blade member (14) defines a rocker to facilitate rocking, cutting movement.

21 Claims, 1 Drawing Sheet

MANUAL SHEET METAL CUTTER

BACKGROUND OF THE INVENTION

This invention generally relates to a scissor-like cutter and, particularly to a manual sheet metal cutter.

Scissor-like cutters, generally, and a manual, sheet metal cutter are well known as shown by U.S. Pat. Nos. 176,553 issued Apr. 25, 1876 to Schafer; 387,283 issued Sept. 7, 1888 to Ducommum; 1,368,431 issued Feb. 15, 1921 to Greenberg; 1,691,989 issued Nov. 20, 1928 to Lonsway; 2,117,224 issued May 10, 1938 to Soss and 2,400,220 issued May 14, 1946 to Bell and 4,463,497 issued Aug. 7, 1984 to O'Keefe.

Only the offset snips shown in O'Keefe U.S. Pat. No. 4,463,497 is especially designed for cutting sheet metal. However, this device requires multiple pivot connection and a complicated assortment of springs, arms and other parts to enable a relatively stationary lower blade and offset handles needed to facilitate cutting sheet metal. Moreover, the cutting blades are not interchangeable with different handles. The multiple pivot points undesirably result in movement of both handles relative to the underlying stationary blade during cutting movement, while the angle of the upper handle cannot be adjusted except during cutting movement. The blades are straight and cannot easily be used to cut curves, while the lower blade member lacks any means, other than the blade itself, for facilitating rocking movement of the lower blade to assert the cutting movement.

SUMMARY OF THE INVENTION

It is therefore a principal object of the present invention to provide a manual sheet metal cutter which is simpler in construction, more versatile and more effective then known sheet metal cutters.

This objective is achieved in part by provision of a manual sheet metal cutter with a generally T-shaped member having an elongate handle defining a base of the T-shaped member joined to an intermediate section of a stationary blade member defining a cross of the T-shaped member, a generally V-shaped member having an elongate handle defining one leg of the V-shaped member and a movable blade member defining another leg of the V-shaped member, and means for pivotally connecting the T-shaped member to the V-shaped member with the movable blade member and stationary blade member in cooperative cutting relationship.

The objective is also partly achieved through provision of a manual sheet metal cutter with a first member having a lower stationary blade member with a lower stationary blade, a laterally offset upper stationary handle, an axle member for pivotally connecting the upper stationary handle to the lower stationary blade in lateral offset relationship and an upper movable blade with a lower movable handle underlying said laterally offset stationary handle and pivotally connected to said axle in cutting relationship with said lower stationary blade.

Achievement of the objective is also obtained with a manual sheet metal cutter having a first, elongate, planar member having a hand grip at one end and a connector portion at an opposite end substantially aligned therewith and having one side, a second, elongate member with a planar hand grip at one end substantially aligned with the hand grip of the first member, an intermediate section having a first side adjacent one side of the first, elongate, planar member and a first curved blade which curves outwardly away from said one side of the first elongate planar member and having a second side opposite the first side, a second curved blade member with a second curved blade with a side in cutting relationship with said second side of the first curved blade and means for securing together the first member and the second member with the first curved blade sandwiched between the connector portion of the first member and the second curved blade.

The objective is also accomplished by providing a manual metal sheet cutter with a first, elongate member having a movable handle lying in a handle plane at one end, a movable upper blade lying in a blade path laterally offset from the handle plane and an intermediate section extending in a lateral direction to join together the movable handle and the movable blade, an elongate, stationary, lower blade member in the blade path lying beneath the movable blade and having an elongate, stationary, lower blade in scissor-like cutting relationship therewith, a second elongate member with a stationary handle lying in the handle plane and means at an opposite end for connection with the elongate, stationary, lower blade, and a fastener coupled with the connection means for fixedly securing the opposite end of the second elongate member to the elongate, stationary, lower blade member and for securing the first elongate member to the elongate, stationary elongate blade member is provided.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DETAILED DESCRIPTION

Figure 1:
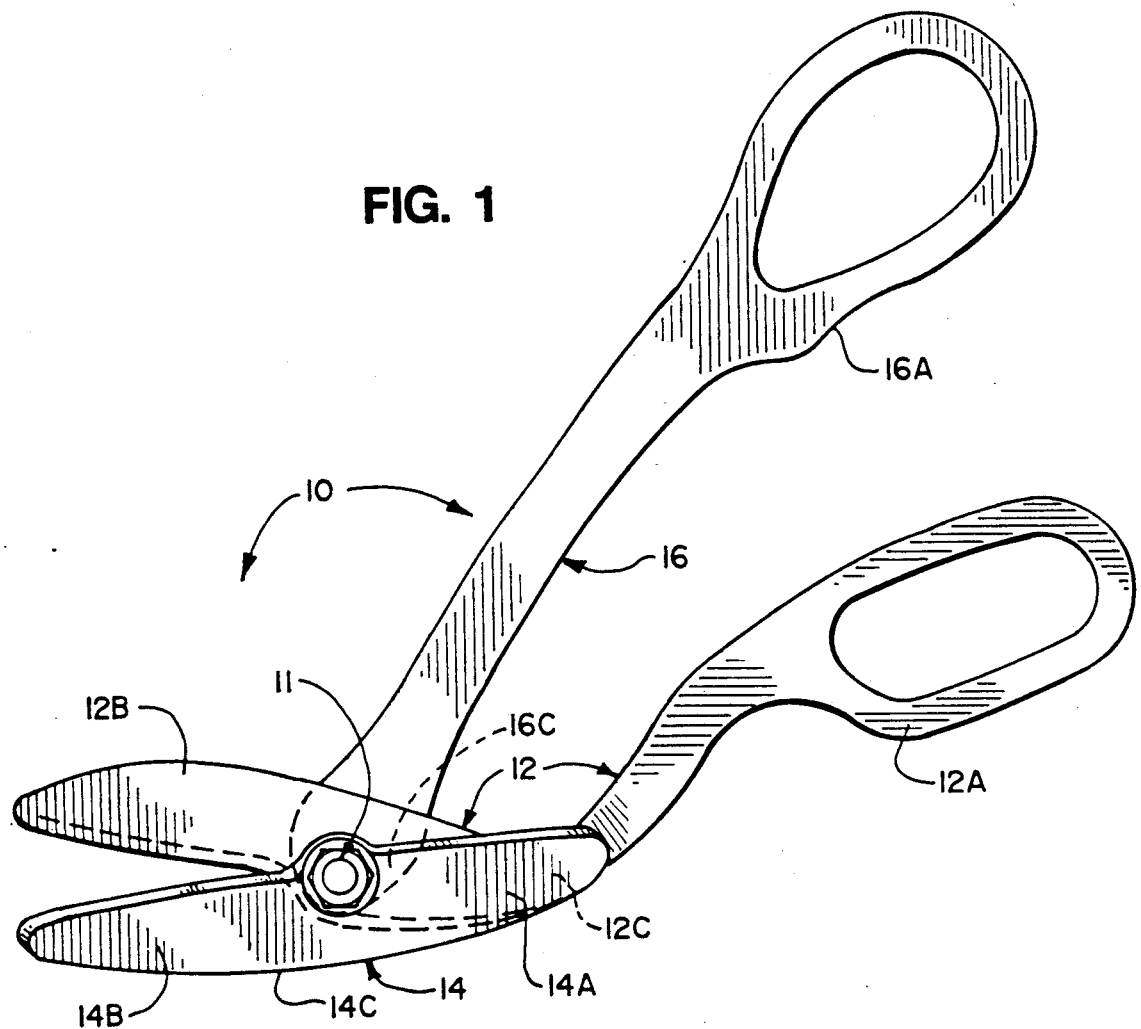
FIG. 1 is a side view of the preferred embodiment of the manual sheet metal cutter of the invention.

Referring now to the drawings, particularly FIG. 1, the preferred embodiment of the sheet metal cutter 10 advantageously is formed of three simple elements pivotally interconnected by a single fastener assembly 11. Preferably, all the elements are made of steel. One of the three elements is defined as a first, elongate generally V-shaped member 12 having a lower, movable handle 12A and an upper movable cutting blade 12B joined together by an intermediate section 12C. A second element is defined by an elongate, stationary, lower blade member 14 which has a rearward extension 14A on one side of fastener assembly 11 and a lower, stationary blade 14B on the other side of fastener assembly 11. The elongate, lower stationary blade member 14B lies in a blade path directly beneath the movable blade 12B in scissor-like cutting relationship therewith. The third element is defined by a second, elongate, planar member 16 having a stationary handle 16A at one end lying directly above the lower, movable handle 12A in a handle plane aligned therewith. Means including a bore 16B, FIG. 2, is provided at the opposite end of the second member for connection with the elongate, stationary, lower blade 14B by means of the fastener assembly 11.

Figure 2:
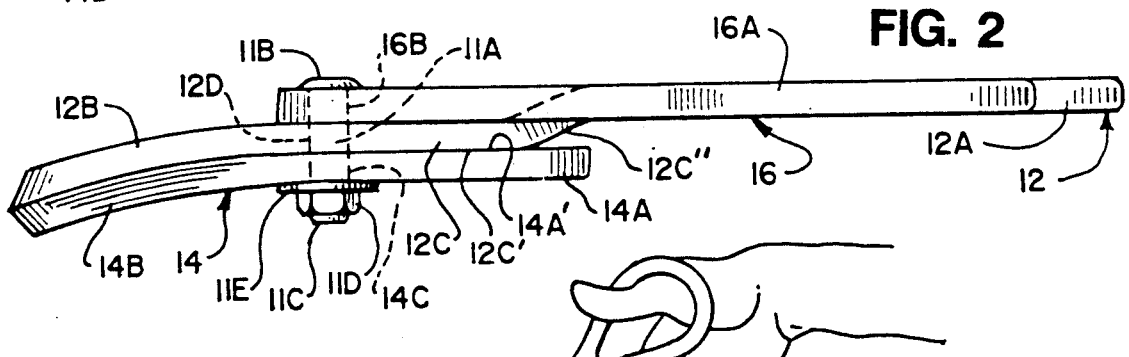
FIG. 2 is a plan view of the preferred embodiment of the manual sheet metal cutter of FIG. 1 but in which the cutter is provided with curved blades.

Referring also to FIG. 2, members 12 and 14 also have bores 12D and 14C, respectively, aligned with bore 16B for receipt therethrough of the shank 11A of a bolt having a bolt head 11B on an outer side of member 16 and a threaded end 11C to which a threaded nut 11D is fastened. Preferably, a lock washer 11E is interposed between the nut 11D and the outer side of member 14. The portion of the shank 11A passing through the bore 12D is not threaded to enable smooth pivotal movement of the upper movable blade 12B relative to the lower stationary blade 14B. Advantageously, the fastener assembly 11 couples with the connection means defined by 16B to secure the end of the second elongate member 16 to the elongate, stationary, lower blade member 14 while at the same time securing the first, elongate, V-shaped member 12 to the stationary, lower blade member 14. The need for multiple pivot axles and multiple connections to secure together the various parts are eliminated.

In keeping with one aspect of the invention, a tight fit between the shank 11A and the bore 16B fixedly holds the upper stationary handle 16A at a preselected angle relative to the lower stationary blade 14 during free pivotal movement of the upper movable blade 12B relative to the lower stationary blade 14B while at the same time enabling selected, adjustable pivotal movement of the upper stationary handle 16A relative to the lower stationary blade 14B, as described. Thus, the second elongate member 16 and the lower, stationary blade member 14 are paired together to define a T-shaped member with the second elongate member 16 defining the base of the T and the stationary blade member 14 defining the cross member of the T.

Figure 3:
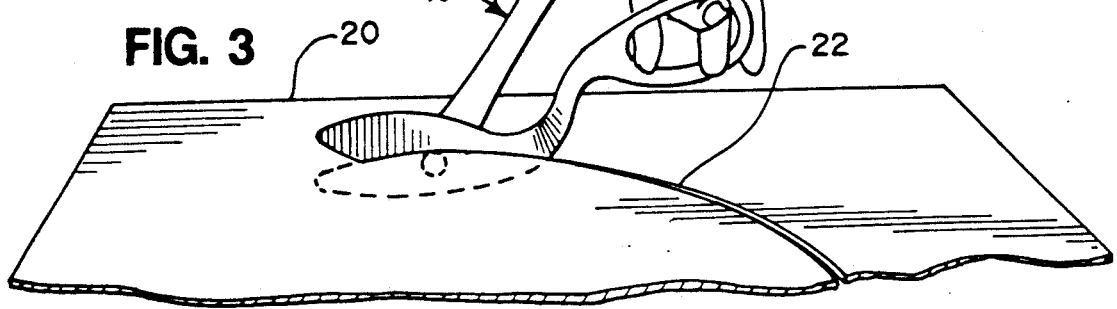
FIG. 3 is a perspective illustration of use of the manual sheet metal cutter of FIG. 2 to make a curved cut.

Still referring to FIG. 2, another advantageous feature of the preferred invention resides in the fact that the stationary blade member 14B and the rearward extension 14A are integrally formed of a single piece of metal, such as steel, and together define a common underlying rocker with a rocker edge surface 14C which extends rearwardly of the pivot axle of fastener assembly 11. By applying force from stationary handle 16A through the second elongate member 16 to the stationary blade member 14 at different selected adjustable angles relative thereto and to the plane of an underlying workpiece 20, FIG. 3, the lower stationary blade 14B can be selectively rocked back and forth to facilitate relative cutting movements between the upper movable blade 12B and the stationary blade 14B.

Another advantageous feature results from the arrangement of an inner side 14A' of the rearward extension 14A of the lower, stationary blade member 14 in bearing aligning relationship with an alignment side 12C' of the intermediate section 12C of the generally V-shaped, first member 12.

Another feature of the preferred embodiment of the manual sheet cutter 10 is that the elongate handle 12A defining one leg of the V of the V-shaped member 12 is laterally offset from the movable blade 12B of the other leg of the V. The intermediate section 12C has a laterally extending section 12C" to achieve the offset. Likewise, the upper stationary handle 16A is laterally offset from the stationery blade 14B in the same direction and to the same extent as the handle 12A is offset from the stationary blade 14B. Accordingly, the handles 12A and 12B are aligned with one another in a shared handle plane.

Thus, the intermediate section 12C, apart from the laterally extending section 12C", is sandwiched between the connecting end or connector portion 16B of the upper stationary handle member 16C, and the rearward extension, or alignment portion, 14A of the stationary blade member 14.

Another feature of the invention is that the single upper stationary handle is alternatively usable with different matched sets of stationary, lower blades 14B and movable, upper blades 12B. As seen in FIG. 1, the blades 12B and 14A are substantially planar. Alternatively, the blades 14B and 12B are curved as shown in FIG. 2 to facilitate the cutting of curves, such as curve 22 of FIG. 3. The blades 12B and 14B curve outwardly away from the handles 12A and 16A. However, advantageously, the stationary handle member 16 is mountable on either side of the blades 12B and 14B to enable use of the handle member 16 with left hand curved blades, as shown in FIG. 2, and with right hand blades which are mirror images of the left hand blades shown in FIG. 2.

While a particular embodiment has been disclosed as the best mode of practicing the invention, it should be appreciated that variations may be made without departing from the scope of the invention as defined in the appended claims.

I claim:

1. A manual sheet metal cutter, comprising:
   a generally T-shaped member having an elongate handle defining a base of the T-shaped member joined to an intermediate section of a stationary blade member defining a cross of the T-shaped member;
   a generally V-shaped member having an elongate handle defining one leg of a V-shaped member and a movable blade member defining another leg of the V-shaped member which is laterally offset from the elongate handle of the V-shaped member in one direction; and
   means for pivotally connecting the T-shaped member to the V-shaped member with the movable blade member and stationary blade member in cooperative cutting relationship.

2. The manual sheet metal cutter of claim 1 in which the stationary blade member has a blade on one side of the intermediate section, and
   an elongate alignment portion on an opposite side of the intermediate section for bearing alignment with the V-shaped member.

3. The manual sheet metal cutter of claim 2 in which the movable blade member has
   a blade at one end, and
   an elongate alignment section for bearing engagement with the elongate alignment portion of the stationary blade member.

4. The manual sheet metal cutter of claim 1 in which said pivotally connecting means includes
   means for adjustably, pivotally joining the elongate handle to the intermediate section to selectively form different angles with the stationary blade.

5. The manual sheet cutter of claim 1 in which said moveable blade member is curved laterally, outwardly in said one direction.

6. A manual sheet metal cutter, comprising a first member having
   a lower stationary blade member with a lower stationary blade;
   a laterally offset upper stationary handle;

an axle member for pivotally connecting the upper stationary handle to the lower stationary blade in lateral offset relationship; and an upper movable blade member with a lower movable handle in which the lower movable handle is laterally offset from the upper movable blade member and in underlying relationship to the laterally offset stationary handle and pivotally connected to said axle in cutting relationship with said lower stationary blade.

7. The sheet metal cutter of claim 6 in which said axle member includes a threaded bolt which passes through each of the lower stationary blade, the upper movable blade with a lower movable handle and the upper stationary handle in that order, and a nut for threadably adjusting the tightness of the connection therebetween.

8. The sheet metal cutter of claim 6 in which the lower and upper blades are both curved laterally outwardly in a direction away from the upper stationary handle.

9. The sheet metal cutter of claim 6 in which the lower movable handle is sandwiched between the lower stationary blade and the upper handle connected therewith.

10. The sheet metal cutter of claim 6 in which the lower stationary blade member has an alignment portion extending away from the axle and the lower stationary blade to provide bearing alignment with the lower handle to correctly align the lower stationary blade and the upper movable blade in a cooperative cutting relationship.

11. A manual sheet metal cutter, comprising:

a first, elongate, planar member having a hand grip at one end and a connector portion at an opposite end substantially aligned therewith and having one side;

a second elongate member having a planar grip at one end substantially aligned with the hand grip of the first member, an intermediate section having a first side adjacent one side of the first, elongate, planar member, and a first curved blade laterally offset from the intermediate section by a laterally extending section connecting the blade to the intermediate section and in which the blade curves outwardly away from said one side of the first elongate planar member and having a second side opposite the first side;

a second curved blade member with a second curved blade having a side in cutting relationship with said second side of the first curved blade; and means for securing together the first member and the second member with the first curved blade sandwiched between the connector portion of the first member and the second curved blade.

12. The manual sheet metal cutter of claim 11 in which said planar hand grip, said intermediate section and said first curved blade of the second member are integrally formed from a single piece of metal.

13. The manual sheet metal cutter of claim 11 in which said second member has a substantially V-shaped profile with one leg of the V-shaped profile defining the curved blade, and a substantially planar rearward extension thereof for bearing alignment with a rearward substantially planar, rearward extension of the second curved blade.

14. The manual sheet metal cutter of claim 11 in which said second curved blade member has a substantially planar rearward extension extending from said curved blade, said securing means being located intermediate the second curved blade and the rearward extension.

15. The manual sheet metal cutter of claim 11 in which the connector portion includes means for carrying a pivot axle of the securing means.

16. A manual metal sheet cutter comprising:

a first, elongate member having a movable handle lying in a handle plane at one end, a movable upper blade lying in a blade path laterally offset from the handle plane, and an intermediate section extending in a lateral direction to join together the movable handle and the movable blade;

an elongate, stationary, lower blade member in the blade path lying beneath the movable blade and having an elongate, stationary, lower blade in scissor-like cutting relationship therewith;

a second elongate member having a stationary handle lying in the handle plane, and means at an opposite end for connection with the elongate, stationary, lower blade; and a fastener coupled with the connection means for fixedly securing the opposite end of the second elongate member to the elongate, stationary, lower blade member, and securing the first elongate member to the elongate, stationary elongate blade member.

17. The manual metal sheet cutter of claim 16 in which said fastener is a single pivot axle providing a common pivot axis for each of the first elongate member, the elongate, stationary, lower blade member and the second elongate member.

18. The manual metal sheet cutter of claim 16 in which said pivot axle is defined by a single threaded bolt.

19. The manual metal sheet cutter of claim 16 in which said elongate, stationary, lower blade member has a rearward extension on a side of the fastener opposite the elongate, stationary, lower blade.

20. The manual metal sheet cutter of claim 19, in which said elongate, stationary blade member and its rearward extension define a rocker beneath the blade to facilitate rocking cutting movements between the upper and lower blades.

21. The manual metal sheet cutter of claim 19 in which the first elongate connector is pivotally connected to the elongate stationary lower blade member to enable adjustment of the relative angle therebetween during rocking movement of said rocker.

* * * * *